(12) United States Patent
Harriman, Jr. et al.

(10) Patent No.: US 12,485,473 B2
(45) Date of Patent: Dec. 2, 2025

(54) FASTENER DELIVERY SYSTEM HAVING AN INSERTION DEVICE

(71) Applicant: The Boeing Company, Arlington, VA (US)

(72) Inventors: Joseph Brian Harriman, Jr., Summerville, SC (US); Edward Ray Duncan, Goose Creek, SC (US); Joshua Allen Halbritter, Summerville, SC (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/663,421

(22) Filed: May 14, 2024

(65) Prior Publication Data

US 2025/0353072 A1    Nov. 20, 2025

(51) Int. Cl.
B21J 15/32    (2006.01)
(52) U.S. Cl.
CPC .................................... B21J 15/32 (2013.01)
(58) Field of Classification Search
CPC ....................................................... B21J 15/32
See application file for complete search history.

(56) References Cited

U.S. PATENT DOCUMENTS

| | | |
|---|---|---|
| 2,340,066 A | 1/1944 | Lee |
| 2,570,801 A | 10/1951 | Hamlin |
| 3,258,835 A | 7/1966 | Boggild et al. |
| 3,363,445 A | 1/1968 | Sanders et al. |
| 3,367,166 A | 2/1968 | Newton et al. |
| 3,764,054 A | 10/1973 | Monacelli |
| 4,220,033 A | 9/1980 | Powderley |
| 5,366,134 A * | 11/1994 | Green ................... A61B 17/105 227/176.1 |
| 5,733,089 A | 3/1998 | Albright |
| 6,018,863 A | 2/2000 | Altrock |
| 6,796,454 B1 * | 9/2004 | Matthews ................ B21J 15/32 227/135 |

(Continued)

FOREIGN PATENT DOCUMENTS

| | | |
|---|---|---|
| CN | 201098868 Y | 8/2008 |
| CN | 202037294 U | 11/2011 |

(Continued)

OTHER PUBLICATIONS

EP Search Report mailed Sep. 24, 2025 in re EP Application No. 25159284.6.

Primary Examiner — Michelle Lopez
(74) Attorney, Agent, or Firm — COATS & BENNETT, PLLC

(57) ABSTRACT

A system to deliver a fastener to a workpiece. The system includes a delivery device configured to hold the fastener. An insertion device receives the fastener from the delivery device. The insertion device includes jaws that are pivotally connected together and an insertion member engaged with the jaws with the insertion member movable relative to the jaws between a retracted position and an extended position. In the retracted position the insertion member positions the jaws at a closed position to prevent the fastener from being released from the jaws. In the extended position the insertion member positions the jaws in an open position to release the fastener from the jaws.

20 Claims, 10 Drawing Sheets

(56) References Cited

U.S. PATENT DOCUMENTS

| | | | |
|---|---|---|---|
| 7,219,526 B2 | 5/2007 | Herod | |
| 7,234,376 B2 | 6/2007 | Bader | |
| 9,021,688 B2 | 5/2015 | Krejci | |
| 2015/0059535 A1* | 3/2015 | Ford, Jr. | B25B 5/08 |
| | | | 81/116 |
| 2016/0082501 A1 | 3/2016 | Zieve et al. | |

FOREIGN PATENT DOCUMENTS

| | | |
|---|---|---|
| CN | 203409726 U | 1/2014 |
| CN | 105436389 B | 5/2017 |
| CN | 217290626 U | 8/2022 |
| DE | 7934999 U1 | 3/1980 |
| DE | 102015108621 A1 | 12/2016 |
| EP | 0038396 B1 | 9/1984 |
| EP | 0456852 B1 | 8/1994 |
| EP | 1452276 B1 | 12/2010 |
| EP | 3034195 B1 | 6/2019 |
| GB | 602853 A | 6/1948 |
| GB | 747766 A | 4/1956 |
| WO | 9528242 A1 | 10/1995 |

* cited by examiner

FASTENER DELIVERY SYSTEM HAVING AN INSERTION DEVICE

TECHNOLOGICAL FIELD

The present disclosure relates generally to the field of fasteners and, more specifically, to a system and components that enable delivery of the fasteners into openings in a workpiece.

BACKGROUND

Fasteners are used to connect and/or hold two or more different components together.

Fasteners basically include a head and an elongated shaft. During use, the shaft of the fastener is inserted through openings in the components with the head on a first side of the components and the tail of the shaft on the opposing second side. The tail is then deformed or otherwise secured to connect the components together and prevent the fastener from being removed from the openings. In many applications, multiple fasteners are used to connect components together. For example, a large number of fasteners are used to secure large structural sections of an aircraft.

Current methods of installing fasteners include a technician manually grabbing a handful of fasteners and holding the fasteners in their hand. The technician then uses their other hand to grasp and insert one of the fasteners into openings in the workpiece. An issue with this method is the likelihood of the technician dropping one or more fasteners during the process. This can occur while holding the handful of fasteners, grasping a fastener from their hand, moving the fastener to the workpiece, and/or inserting the fastener into the workpiece. Once dropped, the fasteners can move into crevices and other places that are difficult to retrieve. On an aircraft, one danger with loose fasteners is the possibility of them remaining loose within the aircraft and potentially causing damage during use of the aircraft (which is often referred to as foreign object damage (FOD)).

Another issue with the current methods is the need for the technician to use both hands during the fastener insertion process. The first hand is needed to hold or carry the fasteners, while the second hand is needed to grab an individual fastener and insert the fastener into an opening in the workpiece. This two-handed process prevents the technician from simultaneously performing other functions. For example, the fasteners are often taped into position on the workpiece after being inserted into the openings. The current method requires either a second technician to perform the taping while the first technician is holding and/or inserting the fasteners or requires the first technician to tape the fasteners at some time after insertion.

SUMMARY

One aspect is directed to a system to deliver a fastener to a workpiece. The system comprises a delivery device configured to hold the fastener. An insertion device receives the fastener from the delivery device. The insertion device comprises: jaws that are pivotally connected together; and an insertion member engaged with the jaws with the insertion member movable relative to the jaws between a retracted position and an extended position. In the retracted position the insertion member positions the jaws at a closed position to prevent the fastener from being released from the jaws. In the extended position the insertion member positions the jaws in an open position to release the fastener from the jaws.

In another aspect, a track comprising an elongated shape is positioned in the jaws with the track aligned in the jaws along a movement axis of the insertion member, and a pin that extends outward from the insertion member and is positioned in the track with the pin contacting against each of the jaws.

In another aspect, the track comprises a non-linear shape with movement of the pin along the track moving the jaws between the closed position and the open position.

In another aspect, the track comprises a first slot in a first one of the jaws and a second slot in a second one of the jaws with the first slot and the second slot aligned in an overlapping arrangement.

In another aspect, the system comprises a trigger and an actuator that drives the insertion member between the retracted position and the extended position with the actuator operated based on inputs from the trigger.

In another aspect, a sensor is configured to detect the fastener positioned in the jaws.

In another aspect, the insertion member is positioned within the jaws and comprises a first end that contacts against the fastener.

In another aspect, the delivery device is directly connected to the insertion device.

In another aspect, the delivery device comprises an escapement device with the escapement device comprising: a body comprising an outlet; a cartridge connected to the body and configured to hold the fastener; a shuttle movably connected to the body with the shuttle comprising a receptacle configured to receive the fastener, and wherein the shuttle is movable relative to the body between a first position with the receptacle aligned with the cartridge to receive the fastener from the cartridge and a second position with the receptacle aligned with the outlet.

One aspect is directed to a device to deliver a fastener to a workpiece. The device comprises: a body; jaws pivotally mounted to the body and comprising edges to grip the fastener with the jaws movable between a closed position and an open position; a track that extends along the jaws with the track having a non-linear shape along a length that extends between a first end and a second end with the track being aligned along a movement axis; and an insertion member positioned at the jaws and movable along the movement axis between a retracted position and an extended position with the insertion member comprising an engagement end configured to contact against the fastener and a pin that is engaged with the track. Wherein movement of the pin within the track positions the jaws with the jaws in the closed position and the pin at the first end of the track with the insertion member in the retracted position and with the jaws in the open position and the pin at the second end of the track with the insertion member in the extended position.

In another aspect, the track comprises a plurality of sections with one or more of the sections aligned at a parallel orientation with the movement axis and one or more of the sections aligned at one or more non-parallel orientations with the movement axis.

In another aspect, a trigger is mounted to the body, an actuator is mounted to the body and configured to engage with the insertion member with the actuator movable between a first position to locate the insertion member at the retracted position and a second position to locate the insertion member at the extended position, and wherein movement of the actuator is controlled by the trigger.

In another aspect, a sensor is configured to determine the position of the jaws.

In another aspect, the track comprises a first slot in a first one of the jaws and a second slot in a second one of the jaws with the first slot and the second slot aligned in an overlapping arrangement.

In another aspect, a spring is engaged with the insertion member to bias the insertion member towards the retracted position.

One aspect is directed to a method of delivering a fastener to a workpiece. The method comprises: moving the fastener between jaws and grasping the fastener with the jaws; moving an insertion member in a first direction and moving the fastener forward along the jaws; while moving the insertion member moving the pin of the insertion member in the first direction along a track and simultaneously opening the jaws; moving the fastener with the insertion member in the outward direction beyond a tip of the jaws; and moving the insertion member in an opposing second direction and moving the pin along the track in the second direction and simultaneously closing the jaws.

In another aspect, the method further comprises after opening the jaws to a predetermined angular position, moving the fastener with the insertion member outward beyond the tip of the jaws while the jaws remain in the predetermined angular position.

In another aspect, the method further comprises moving the fastener along the jaws in the outward direction while maintaining an angular position of the jaws.

In another aspect, the method further comprises contacting the pin with both a first one of the jaws and a second one of the jaws while moving the pin along the track.

In another aspect, the method further comprises sensing the fastener between the jaws prior to moving the insertion member in the first direction.

The features, functions and advantages that have been discussed can be achieved independently in various aspects or may be combined in yet other aspects, further details of which can be seen with reference to the following description and the drawings.

DETAILED DESCRIPTION

Figure 1:
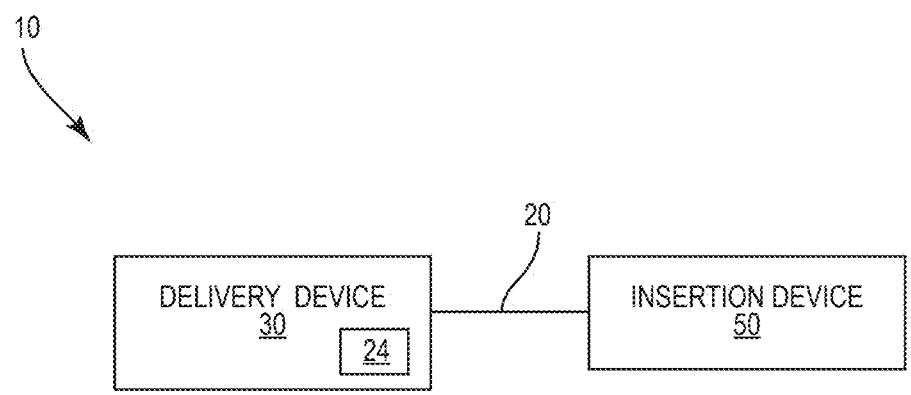
FIG. 1 is a schematic diagram of a fastener delivery system.
Figure 1A:
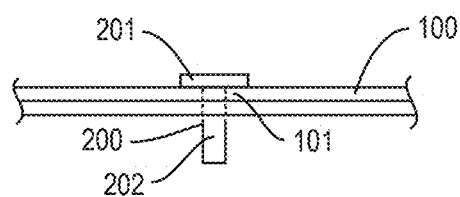
FIG. 1A is a side view of a fastener inserted into a workpiece.

FIG. 1 illustrates a fastener delivery system 10 that includes a delivery device 30 that individually shuttles fasteners to an insertion device 50. The insertion device 50 receives and grasps a fastener for alignment with the workpiece 100. The insertion device 50 also provides for inserting the fastener into the workpiece 100. FIG. 1A illustrates a fastener 200 that is positioned in a workpiece 100. The fastener 200 includes a head 201 that is positioned on a first side of the workpiece 100 and a shaft 202 that extends through one or more openings 101 in the workpiece 100.

The fastener delivery system 10 is configured to handle a wide range of different fasteners 200. Examples of fasteners 200 include but are not limited to rivets, pins, and bolts.

In some examples, the delivery device 30 includes a body that is connected to the insertion device 50. In one example, the body includes a threaded neck that is configured to mount to the insertion device 50. The fasteners 200 move individually through the neck and into the insertion device 50. In other examples, a feed tube 20 such as a conduit or pipe connects the delivery device 30 and insertion device 50. The fasteners 200 move from the delivery device 30, through the feed tube 20, and into the insertion device 50.

Figure 2:
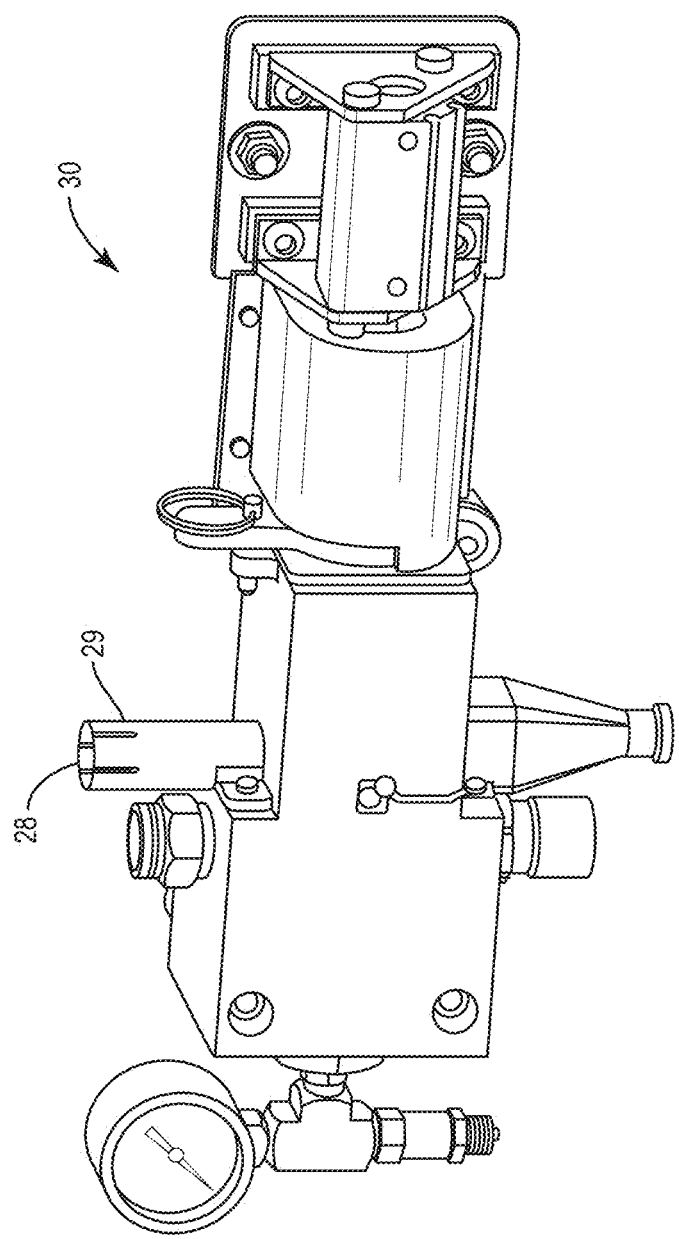
FIG. 2 is an isometric view of a delivery device.
Figure 3A:
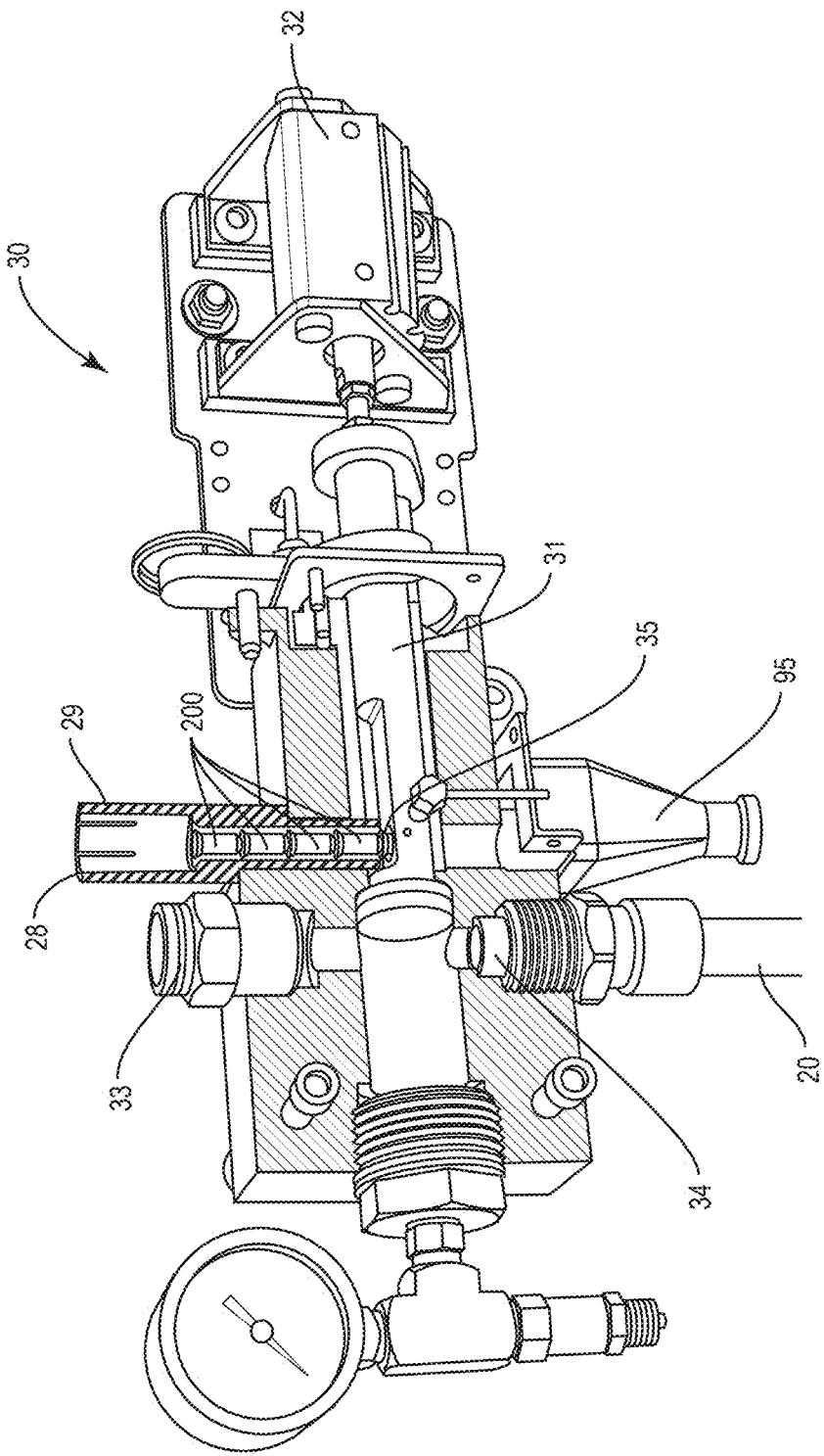
FIG. 3A is a partial schematic section view of the delivery device of FIG. 2 with a shuttle in a first position.
Figure 3B:
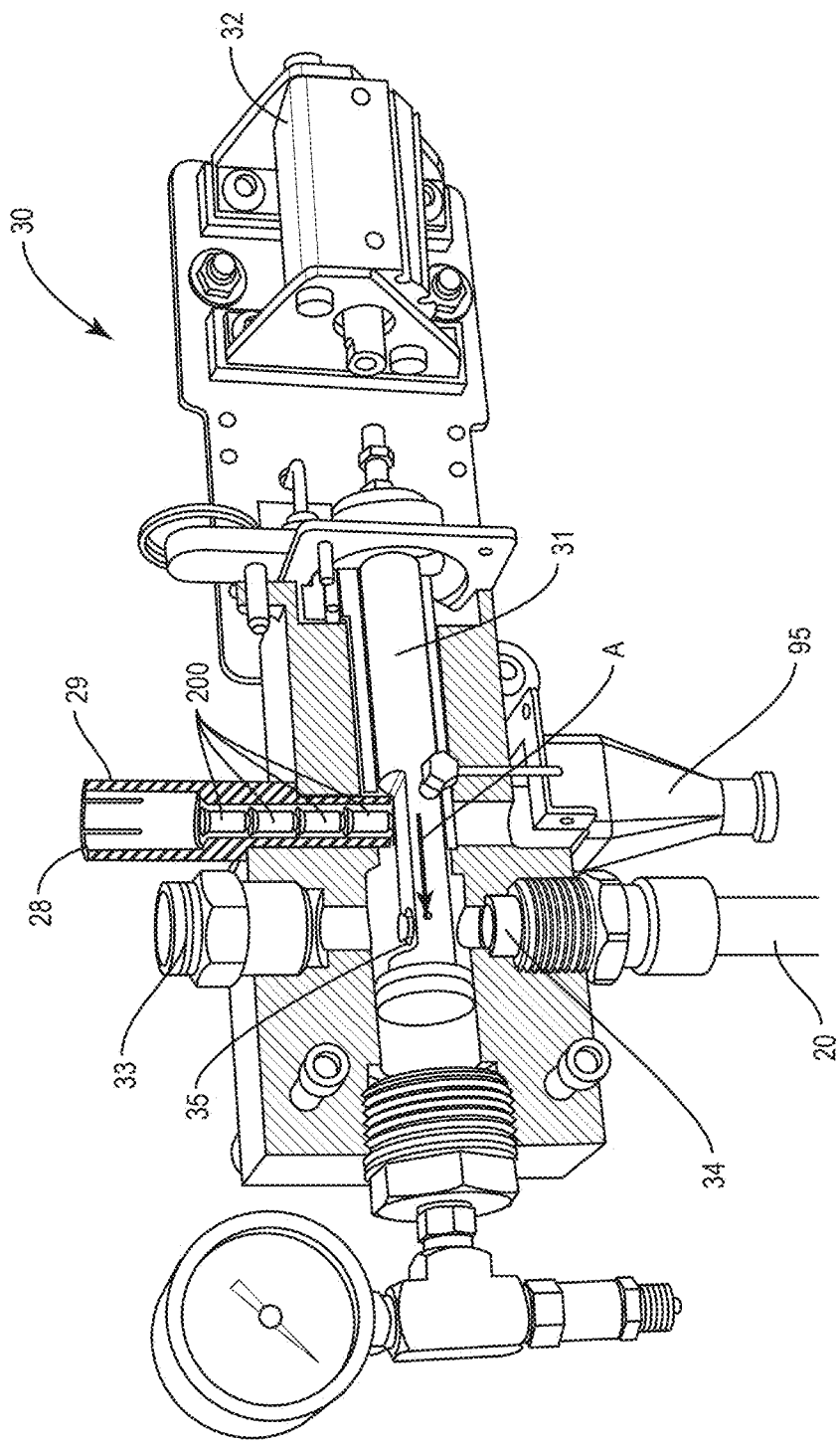
FIG. 3B is a partial schematic section view of the delivery device of FIG. 2 with the shuttle in a second position.

In one example as illustrated in FIGS. 2, 3A, and 3B, the delivery device 30 is an escapement device that includes a cartridge 29 configured to hold fasteners 200 in a stacked arrangement. In some examples, the cartridge 29 has an open end 28 configured to receive the fasteners 200. The fasteners 200 can be manually inserted into the open end 28 and/or delivered through a tube from an upstream source such as a sorting bowl. The fasteners 200 are oriented in a single direction within the cartridge 29. In some examples, the fasteners 200 move through the cartridge 29 by gravity (i.e., the cartridge 29 is vertically aligned). Additionally or alternatively, the cartridge 29 includes a pneumatic input (not illustrated) to force the fasteners 200 through the cartridge 29.

A shuttle 31 with a receptacle 35 receives the fasteners 200 from the cartridge 29. The shuttle 31 is movable relative to the cartridge 29 between loading and unloading positions. An actuator 32 selectively moves and positions the shuttle 31 between the two positions. The delivery device 30 also includes an air inlet 33 that is connected to an air source and an outlet 34 where the fasteners 200 are expelled.

During use as illustrated in FIG. 3A, the shuttle 31 is aligned at a first position with the receptacle 35 located at the cartridge 29. A single fastener 200 moves from the feed cartridge 29 into the receptacle 35. As illustrated in FIG. 3B, the shuttle 31 is then moved in the direction of arrow A by the actuator 32 to the second position. This aligns the receptacle 35 and the fastener 200 with the outlet 34. With the shuttle 31 in the second position, air blown through the inlet 33 causes the fastener 200 to move out of the receptacle 35 and through the outlet 34. In some examples, the outlet 34 is directly connected to the insertion device 50. In the example of FIGS. 3A and 3B, a feed tube 20 is attached to the outlet 34 to direct the fastener 200 to the insertion device 50 that is located remotely from the delivery device 30. In some examples as illustrated in FIG. 3B, the delivery device 30 is aligned for the receptacle 35 to be positioned vertically above the outlet 34 to allow for gravity to cause the fastener 200 to fall from the receptacle 35 and into the outlet 34.

After delivery of the fastener 200, the actuator 32 returns the shuttle 31 to the first position as illustrated in FIG. 3A. The process repeats with the next fastener 200 being delivered to the receptacle 35 from the cartridge 29.

Figure 4:
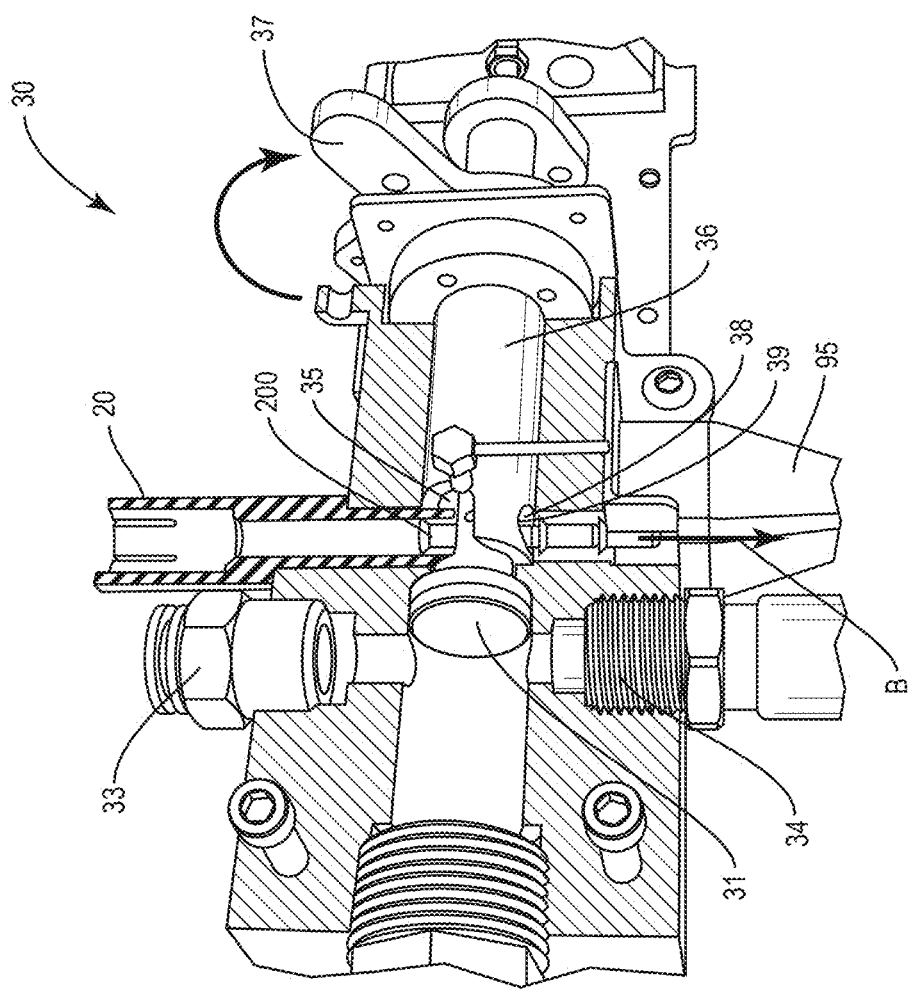
FIG. 4 is a partial schematic section view of a delivery device.

At various times it may be necessary for the technician to clean out the fasteners 200 that are in the cartridge 29. Examples include when changing to a different type of fastener 200, and at the end of a work shift. To enable clean out of the fasteners 200, the delivery device 30 includes a sleeve 36 positioned around the shuttle 31 as illustrated in FIG. 4. The sleeve 36 is rotatable relative to the shuttle 31 and includes a handle 37. The sleeve 36 also includes an opening 38. During normal operation (i.e., non-clean out), the handle 37 and sleeve 36 are at a first rotational position. This first rotational position aligns a solid section of the sleeve 36 with an opening 39 at the bottom of the shuttle 31. This provides for the fasteners 200 that are moved to the shuttle 31 to remain in the receptacle 35 to be delivered laterally to the outlet 34. To clean out the fasteners 200 from the cartridge 29 and shuttle 31, the handle 37 and sleeve 36 are rotated to a second rotational position. This second rotational position aligns the opening 38 in the sleeve 36 with the opening 39 in the shuttle 31. The fastener 200 in the receptacle 35 and/or fasteners 200 in the cartridge 29 fall through the openings 38, 39 in the direction of arrow B. The fasteners 200 drop into a funnel 95 where they are collected. After the clean out, the handle 37 and sleeve 36 are rotated back to the first position.

Figure 5:
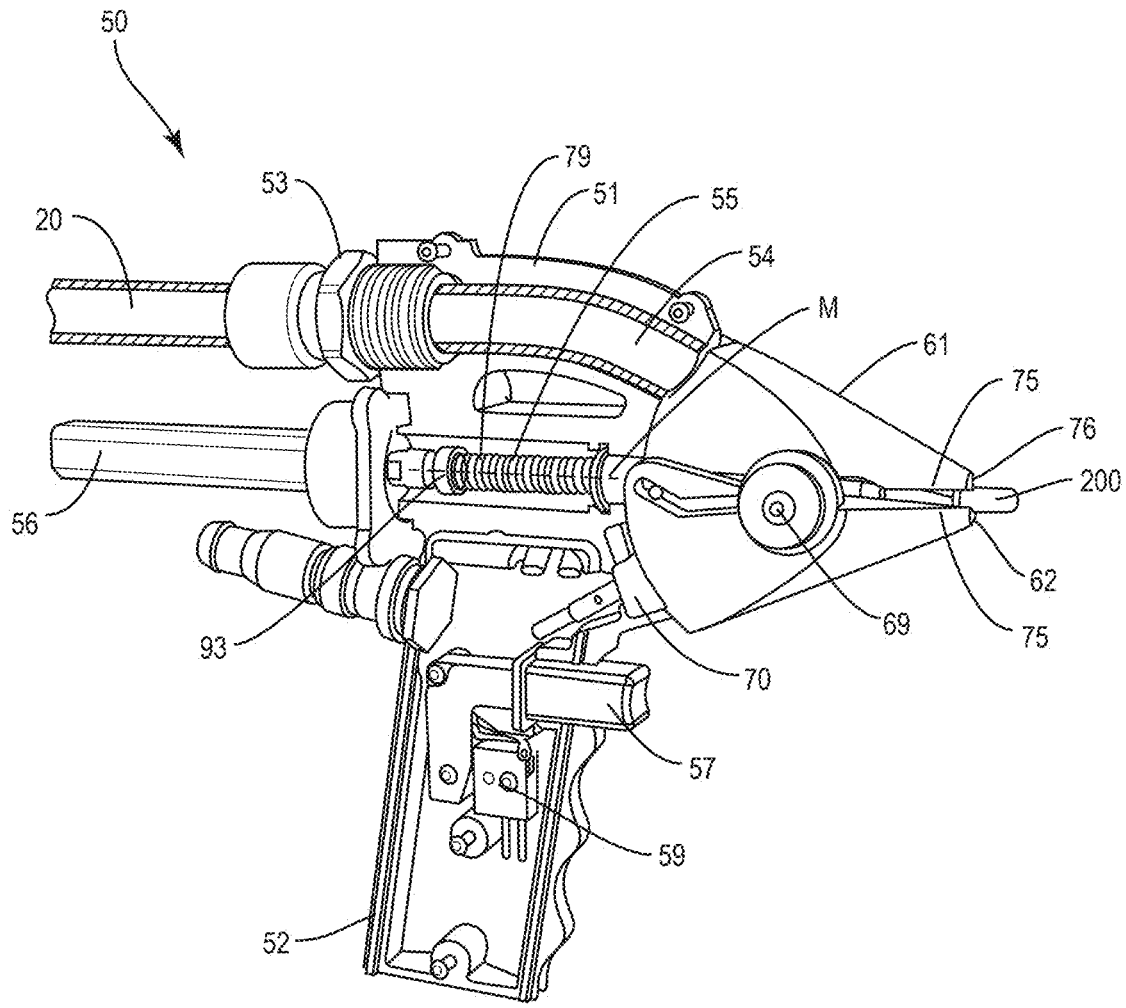
FIG. 5 is a partial section view of an insertion device.

The insertion device 50 receives the fasteners 200 from the delivery device 30. The fasteners 200 may be received directly from the delivery device 30 or through a tube 20. As illustrated in FIG. 5, the insertion device 50 includes a body 51 with a handle 52. Jaws 61, 62 are connected to the body 51 and pivot about an axis 69. In some examples, a spring (not illustrated) biases the jaws 61, 62 towards a closed position. Each of the jaws 61, 62 includes an edge 75 that contacts and secures the fastener 200. The jaws 61, 62 have an angular shape that form a tip 76 from which the fastener 200 is expelled.

A port 53 is configured to connect directly to the delivery device 30 and/or to the tube 20 to receive the fasteners 200. A conduit 54 is positioned within the body 51 to move the fasteners 200 from the port 53 to the jaws 61, 62. An insertion member 55 and actuator 56 are configured to move the fastener 200 out of the jaws 61, 62 and into the workpiece 100. The insertion member 55 has a straight shape with a center line as illustrated in dashes in FIG. 6. The center line forms a movement axis M along which the insertion member 55 moves between retracted and extended positions.

Figure 6:
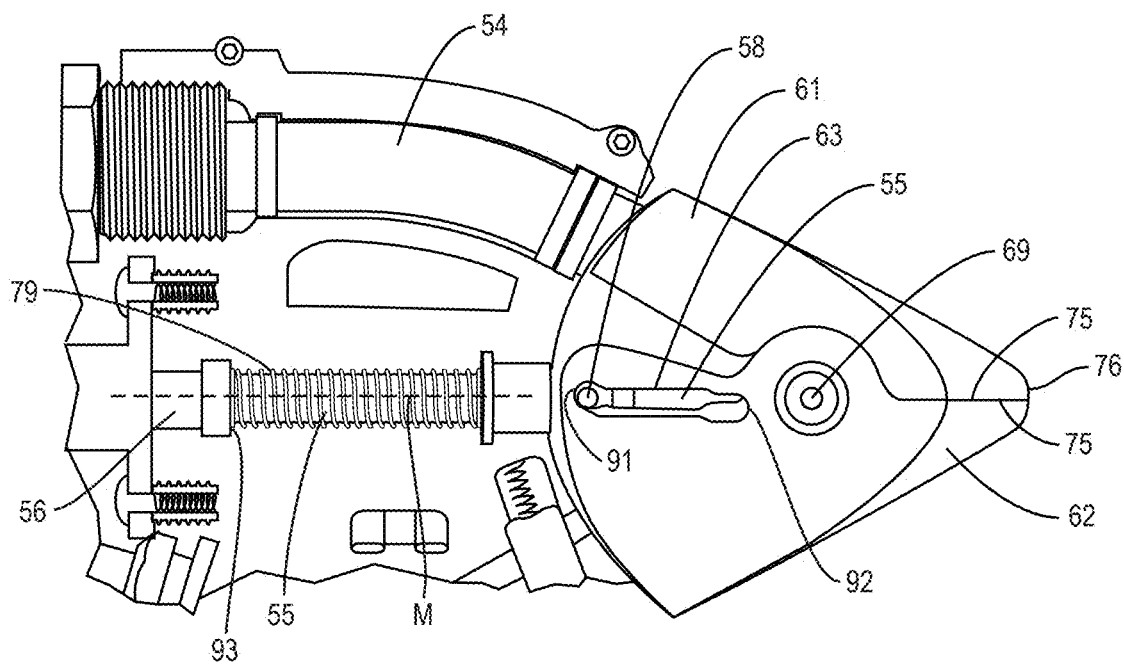
FIG. 6 is a partial side view of an insertion device.
Figure 6A:
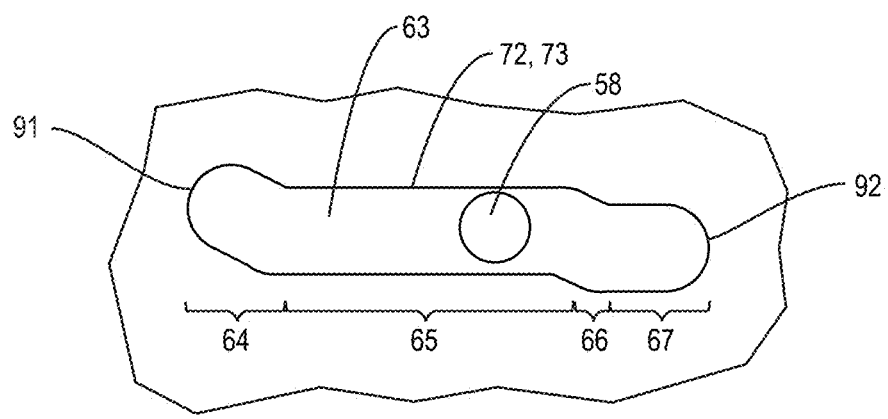
FIG. 6A is a side view of a track of the insertion device of FIG. 6.

As illustrated in FIGS. 6 and 6A, the jaws 61, 62 include a track 63. The track 63 includes an opening in one or both of the jaws 61, 62. In some examples, the track 63 includes slots 72, 73 in the jaws 61, 62 that are aligned in an overlapping arrangement. In other examples, the track 63 includes a slot that extends through one of the jaws (e.g., jaw 62) and that overlaps with an edge of the opposing jaw.

The track 63 has an elongated shape with a length measured between a first end 91 and a second end 92. The track 63 includes a non-linear shape that includes different sections 64, 65, 66, and 67 along the length and substantially aligns with the movement axis M of the insertion member 55. The sections 64-67 have different shapes and/or angular orientations. Further, the track 63 is sized to receive a pin 58 that extends outward from the insertion member 55. As the insertion member 55 moves along the movement axis M, the pin 58 moves along the length of the track 63.

The track 63 can include different shapes depending upon the desired operation of the jaws 61, 62. The different shapes affect the manner in which the pin 58 moves along the track 63 thus causing different movements and timing of jaws 61, 62. Examples include but are not limited to the extent to which the jaws 61, 62 open, the motion of the jaws (e.g., continuous or discrete movements), the timing of the movement of the jaws 61, 62, and the movement of one jaw 61 relative to the other jaw 62.

An actuator 56 drives the insertion member 55 along the movement axis M. In one example, the actuator 56 is positioned to contact against an inner end 93 of the insertion member 55. The actuator 56 is driven by an electric motor (not illustrated) that is controlled through a trigger 57 and associated switch 59.

During use, the insertion device 50 is in a closed position as illustrated in FIG. 6. The edges 75 of the jaws 61, 62 can be in contact in the closed position or can be slightly spaced apart. In some examples, a torsion spring acts on the jaws 61, 62 to bias the jaws towards the closed position. The pin 58 of the insertion member 55 is positioned at the first end 91 of the track 63 which is at the beginning of the first section 64.

Figure 7:
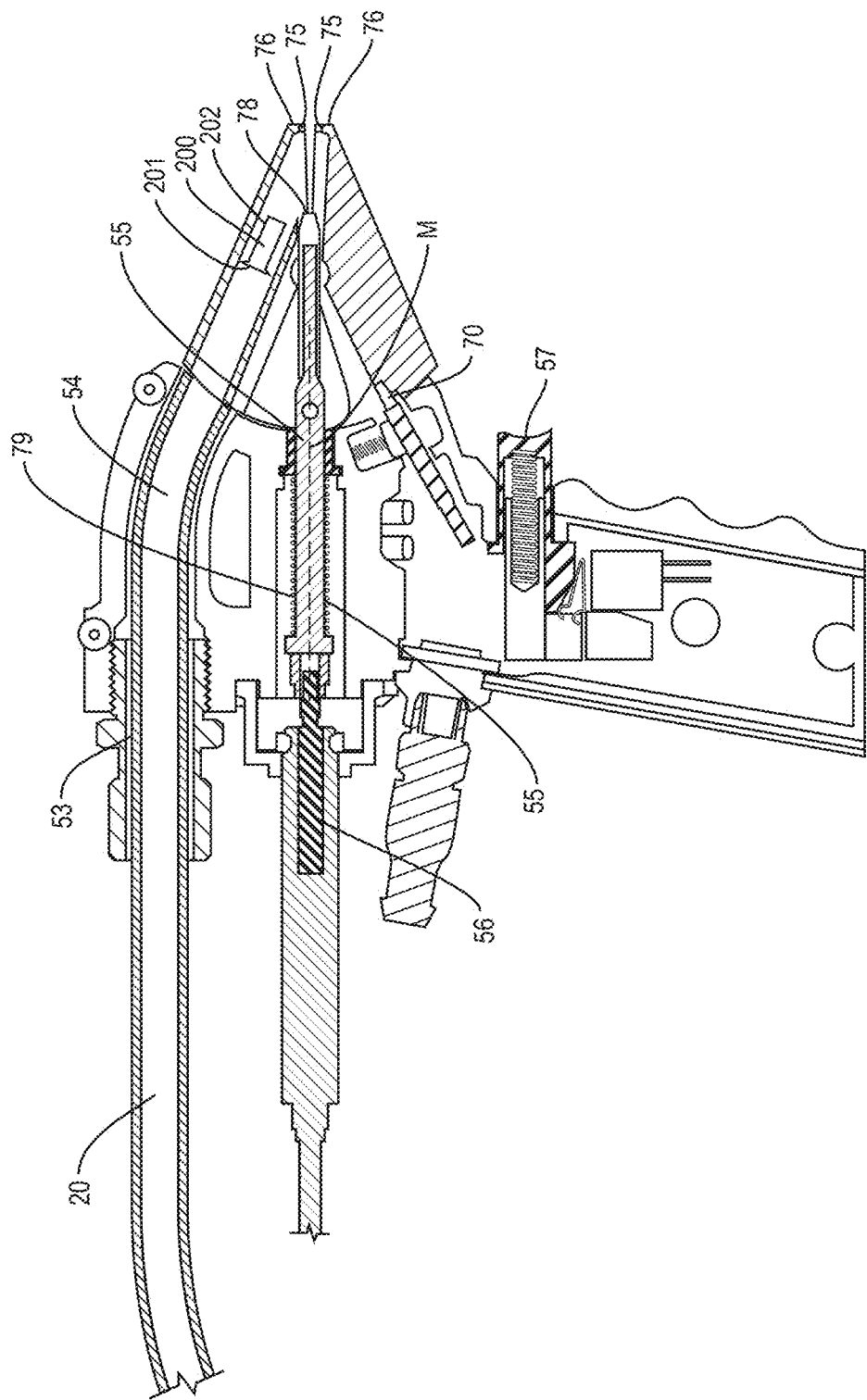
FIG. 7 is a schematic section view of an insertion device with a fastener at a first position.

To receive a fastener 200 in the jaws 61, 62, the trigger 57 is activated causing the actuator 56 to drive the insertion member 55 in a forward direction along the movement axis M. The movement of the insertion member 55 causes the pin 58 to move along the first section 64 of the track 63. The first section 64 is aligned at a non-parallel angle relative to the movement axis M. This movement of the pin 58 along the first section 64 causes the jaws 61, 62 to pivot about the axis 69 and for the edges 75 to separate. In some examples as illustrated in FIG. 7, the amount of pivoting movement is about 2.

At this position, a fastener 200 is moved between the jaws 61, 62 and is held by the edges 75 of the jaws 61, 62. In one example, the edges 75 contact against the head 201 of the fastener 200 with the shaft 202 extending outward beyond the tip 76. The leading end 78 of the insertion member 55 contacts against the head 201 of the fastener 200. In some examples, the head 201 includes a receptacle and the leading end 78 of the insertion member 55 has a shape that matches the receptacle to enable secure engagement.

Figure 8:
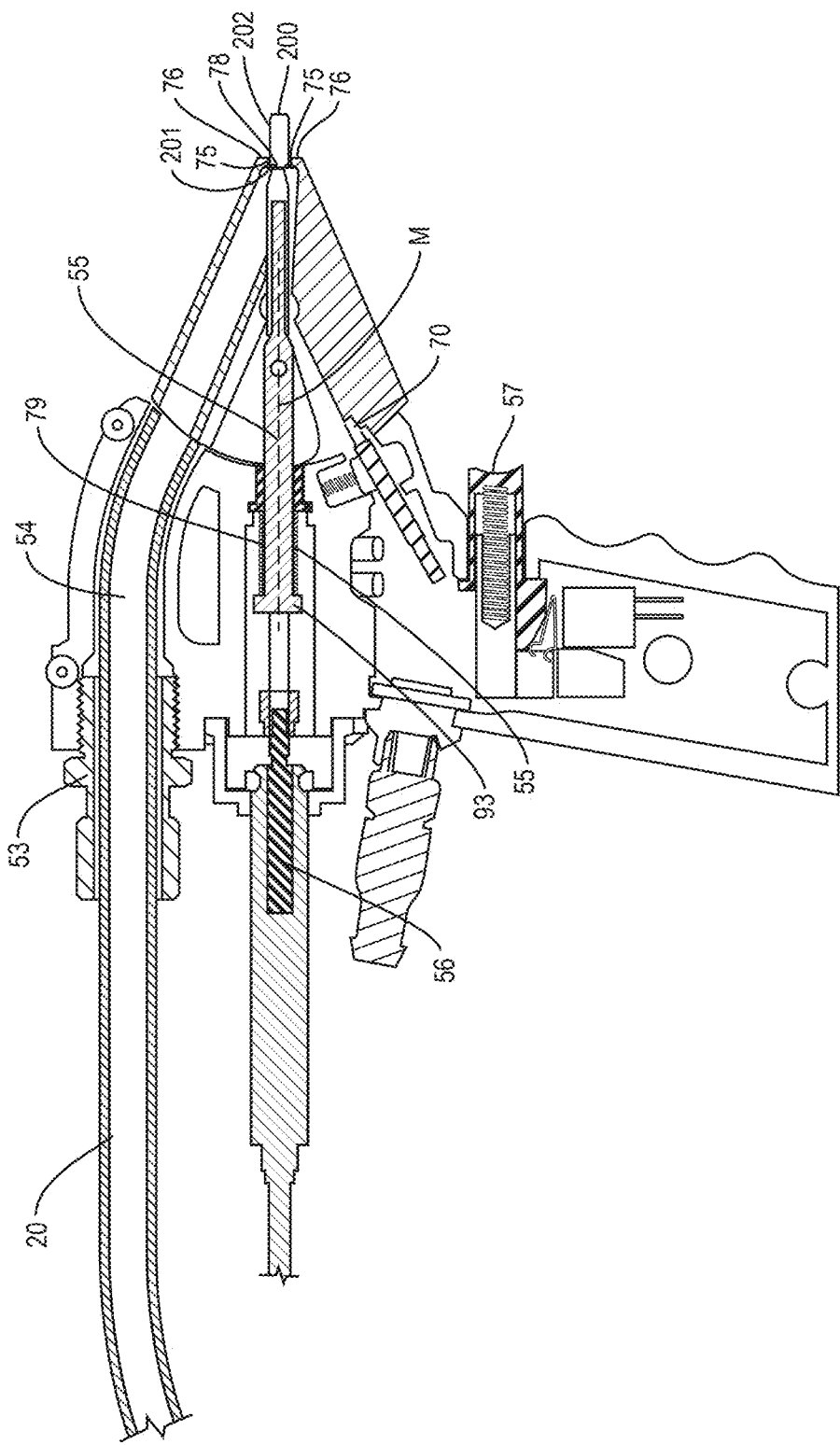
FIG. 8 is a schematic section view of the insertion device of FIG. 7 with the fastener at a second position.

With the trigger 57 being pressed, the process continues causing the actuator 56 to drive the insertion member 55 forward along the movement axis M. This movement causes the pin 58 to move along the second section 65 of the track 63. The second section 65 is aligned parallel with the movement axis M such that the jaws 61, 62 remain at the same angular position (e.g., 2). The insertion member 55 advances the fastener 200 outward to towards the tip 76. In one example as illustrated in FIG. 8, each of the edges 75 includes an indent that receives the head 201 at this position. In this position, the shaft 202 extends farther outward beyond the tip 76.

Depressing the trigger 57 causes the actuator 56 to advance the insertion member 55 an additional amount in the forward direction along the movement axis M. This additional amount moves the pin 58 along the third section 66 of the track 63. The third section 66 is aligned at a non-parallel orientation relative to the movement axis M causing the jaws 61, 62 to pivot open an additional amount. In one example, the jaws 61, 62 pivot open to 7. This additional pivoting movement releases the edges 75 of the jaws 61, 62 from the fastener 200. The forward end 78 of the insertion member 55 remains in contact with the head 201 to prevent the fastener 200 from falling from the insertion device 50. This additional motion of the insertion member 55 also advances the fastener 200 in the forward direction.

The process continues with the insertion member 55 advancing farther in the forward direction. This movement causes the pin 58 to move along the fourth section 67. This movement drives the fastener 200 forward an additional amount. In some examples, this enables the technician to fully insert the fastener 200 into the workpiece 100. The fourth section 67 is aligned parallel with the movement axis M such that this movement causes the jaws 61, 62 to remain at the same pivotal orientation (e.g., 7) while the fastener 200 is being moved outward to seat in the workpiece 100.

After the fastener 200 is seated in the workpiece 100, the technician releases the trigger 57. The release causes the insertion member 55 to retract along the movement axis M in the reverse direction back to the starting point in preparation for receiving a subsequent fastener 200. In some examples, a spring 79 biases the insertion member 55 towards the first position. This process is then repeated for each fastener 200 that is inserted into the workpiece 100.

During the movement of the insertion member 55, the pin 58 slides within the track 63 along edges on each of the jaws 61, 62. This contact and sliding movement controls the angular orientation of the jaws 61, 62 between the closed and opening positions.

In some examples, the insertion device 50 includes a sensor 70 that detects a fastener 200 positioned in the jaws 61, 62. When a fastener 200 is detected, the trigger 57 is able to be activated to allow a technician to further drive the actuator 56 and insert the fastener 200 into the workpiece 100. When a fastener 200 is not detected, the trigger 57 is deactivated to prevent the actuator 56 from driving the insertion member 55. The sensor 70 can include various configurations.

The actuator 56 drives the insertion member 55 for the fastener 200 to be inserted at the desired force and speed. In some examples, the insertion device 50 is configured to drive the fastener 200 at a set force and speed. In other examples, the force and/or speed can be adjusted by the technician.

Figure 9:
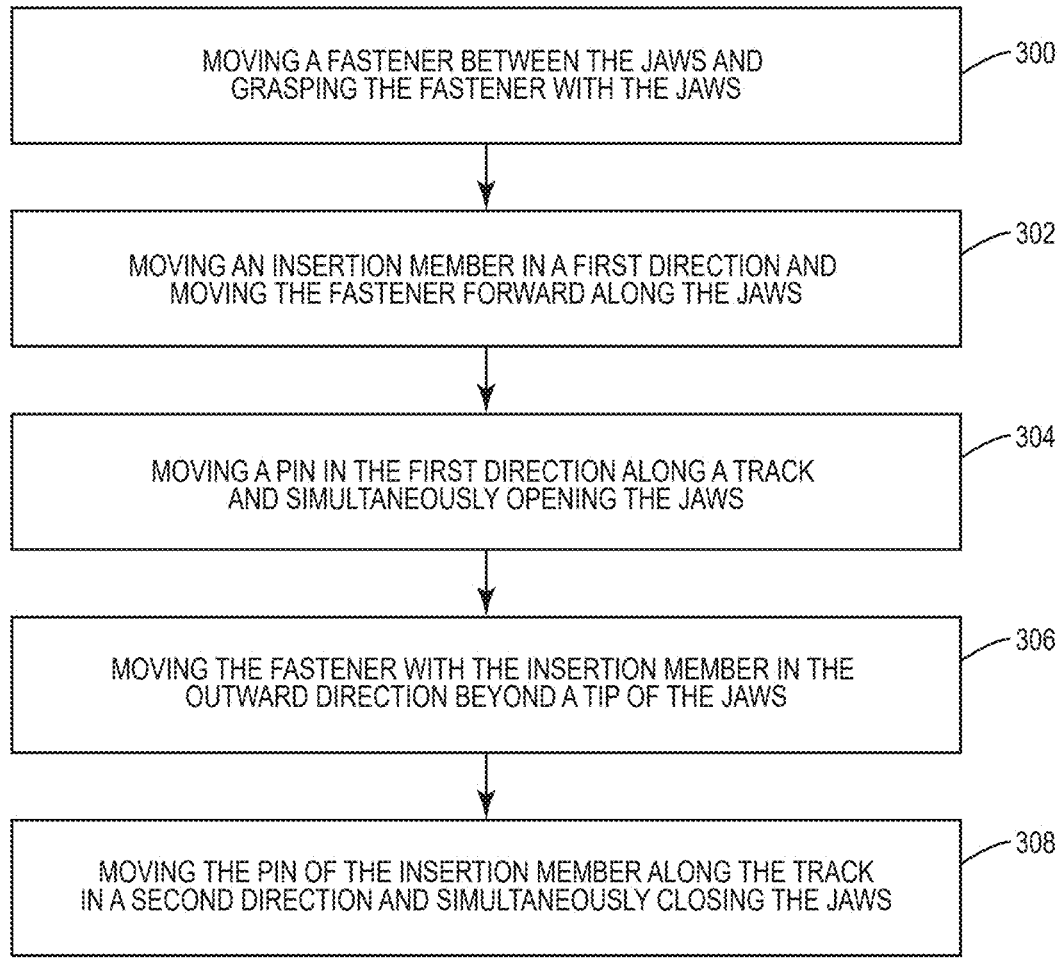
FIG. 9 is a flowchart diagram of a method of delivering a fastener to a workpiece.

FIG. 9 illustrates a method of delivering a fastener 200 to a workpiece 100. A fastener 200 is moved between the jaws 61, 62 and is grasped by the jaws 61, 62 (block 300). An insertion member 55 is moved in a first direction which moves the fastener 200 forward along the jaws 61, 62 (block 302). While moving the insertion member 55, a pin 58 is moved in the first direction along a track 63 which simultaneously opens the jaws 61, 62 (block 304). The fastener 200 is moved with the insertion member 55 in the outward direction beyond a tip 76 of the jaws 61, 62 (block 306). The insertion member 55 is moved in an opposing second direction which moves the pin 58 along the track 63 in the second direction and simultaneously closes the jaws 61, 62 (block 308).

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A device to deliver a fastener to a workpiece, the device comprising:
   an insertion device that receives the fastener, the insertion device comprising:
      jaws that are pivotally connected together;
      a track positioned in the jaws and comprising a length with a non-linear shape;
      an insertion member positioned within and engaged with the jaws and comprising a first end that contacts against the fastener, the insertion member movable relative to the jaws between a retracted position and an extended position, the insertion member further comprising a pin that extends into and moves along the length of the track to cause the jaws to move;
   wherein in the retracted position the insertion member positions the jaws at a closed position to prevent the fastener from being released from the jaws; and
   wherein in the extended position the insertion member positions the jaws in an open position to release the fastener from the jaws.

2. The device of claim 1, further comprising:
   the track comprising an elongated shape and positioned in the jaws, the track aligned in the jaws along a movement axis of the insertion member; and
   the pin extends outward from the insertion member and is positioned in the track with the pin contacting against each of the jaws.

3. The device of claim 2, wherein the track comprises the non-linear shape with movement of the pin along the track moving the jaws between the closed position and the open position.

4. The device of claim 3, wherein the track comprises a first slot in a first one of the jaws and a second slot in a second one of the jaws with the first slot and the second slot aligned in an overlapping arrangement.

5. The device of claim 1, further comprising:
   a trigger; and
   an actuator that drives the insertion member between the retracted position and the extended position, wherein the actuator is operated based on inputs from the trigger.

6. The device of claim 1, further comprising a sensor configured to detect the fastener positioned in the jaws.

7. The device of claim 1, further comprising a delivery device configured to hold the fastener, wherein the delivery device is directly connected to the insertion device.

8. The device of claim 7, wherein the delivery device comprises an escapement device with the escapement device comprising:
   a body comprising an outlet;
   a cartridge connected to the body and configured to hold the fastener;
   a shuttle movably connected to the body, the shuttle comprising a receptacle configured to receive the fastener; and
   wherein the shuttle is movable relative to the body between a first position with the receptacle aligned with the cartridge to receive the fastener from the cartridge, and a second position with the receptacle aligned with the outlet.

9. The device of claim 1, wherein the insertion member comprises a straight shape.

10. A device to deliver a fastener to a workpiece, the device comprising:
    a body;
    jaws pivotally mounted to the body and comprising edges to grip the fastener, the jaws movable between a closed position and an open position;

a track that extends along the jaws, the track having a non-linear shape along a length that extends between a first end and a second end, the track being aligned along a movement axis;

an insertion member positioned at the jaws and movable along the movement axis between a retracted position and an extended position, the insertion member comprising an engagement end configured to contact against the fastener and a pin that is engaged with the track; and wherein movement of the pin within the track positions the jaws with the jaws in the closed position and the pin at the first end of the track with the insertion member in the retracted position and with the jaws in the open position and the pin at the second end of the track with the insertion member in the extended position.

11. The device of claim 10, wherein the track comprises a plurality of sections with one or more of the sections aligned at a parallel orientation with the movement axis and one or more of the sections aligned at one or more non-parallel orientations with the movement axis.

12. The device of claim 10, further comprising:
a trigger mounted to the body;
an actuator mounted to the body and configured to engage with the insertion member, the actuator movable between a first position to locate the insertion member at the retracted position and a second position to locate the insertion member at the extended position; and
wherein movement of the actuator is controlled by the trigger.

13. The device of claim 10, further comprising a sensor configured to determine the position of the jaws.

14. The device of claim 10, wherein the track comprises a first slot in a first one of the jaws and a second slot in a second one of the jaws with the first slot and the second slot aligned in an overlapping arrangement.

15. The device of claim 10, further comprising a spring engaged with the insertion member to bias the insertion member towards the retracted position.

16. A method of delivering a fastener to a workpiece, the method comprising:
moving the fastener between jaws and grasping the fastener with the jaws;
moving an insertion member in a first direction and moving the fastener forward along the jaws;
while moving the insertion member, moving a pin of the insertion member in the first direction along different sections of a track and simultaneously opening the jaws with the different sections of the track comprising one or more different shapes and angular orientations and contacting the pin with both a first one of the jaws and a second one of the jaws while moving the pin along the track;
moving the fastener with the insertion member in an outward direction beyond a tip of the jaws; and
moving the insertion member in an opposing second direction and moving the pin along the track in the second direction and simultaneously closing the jaws.

17. The method of claim 16, further comprising after opening the jaws to a predetermined angular position, moving the fastener with the insertion member outward beyond the tip of the jaws while the jaws remain in the predetermined angular position.

18. The method of claim 16, further comprising moving the fastener along the jaws in the outward direction while maintaining an angular position of the jaws.

19. The method of claim 16, further comprising sensing the fastener between the jaws prior to moving the insertion member in the first direction.

20. The method of claim 16, further comprising sliding the pin along edges on each of the jaws while moving the pin in the first direction and the second direction.

* * * * *